United States Patent
Tan et al.

(10) Patent No.: US 12,530,876 B2
(45) Date of Patent: Jan. 20, 2026

(54) SYSTEMS AND METHODS FOR PROGRESSIVE LEARNING FOR MACHINE-LEARNED MODELS TO OPTIMIZE TRAINING SPEED

(71) Applicant: Google LLC, Mountain View, CA (US)

(72) Inventors: Mingxing Tan, Newark, CA (US); Quoc V. Le, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/761,065

(22) Filed: Jul. 1, 2024

(65) Prior Publication Data

US 2024/0355101 A1 Oct. 24, 2024

Related U.S. Application Data

(63) Continuation of application No. 17/943,880, filed on Sep. 13, 2022, now Pat. No. 12,062,227, which is a
(Continued)

(51) Int. Cl.
| | | |
|---|---|---|
| *G06V 10/00* | (2022.01) | |
| *G06V 10/774* | (2022.01) | |
| *G06V 10/776* | (2022.01) | |

(52) U.S. Cl.
CPC ........ *G06V 10/7747* (2022.01); *G06V 10/776* (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS

| | | |
|---|---|---|
| 8,756,175 B1 | 6/2014 | Szegedy |
| 10,108,607 B2 | 10/2018 | Song et al. |

(Continued)

FOREIGN PATENT DOCUMENTS

| | | |
|---|---|---|
| JP | H05-108593 | 4/1993 |
| JP | H09-91263 | 4/1997 |

(Continued)

OTHER PUBLICATIONS

Tibeta et al., "Implementation of a Method for Simultaneous Estimation of Multiple Parameters and Its Application to Machine Learning Software", Chinese Literature, vol. 25, Jun. 2020, 5 pages.
(Continued)

*Primary Examiner* — Amir Alavi
(74) *Attorney, Agent, or Firm* — DORITY & MANNING P.A.

(57) ABSTRACT

Systems and methods of the present disclosure can include a computer-implemented method for efficient machine-learned model training. The method can include obtaining a plurality of training samples for a machine-learned model. The method can include, for one or more first training iterations, training, based at least in part on a first regularization magnitude configured to control a relative effect of one or more regularization techniques, the machine-learned model using one or more respective first training samples of the plurality of training samples. The method can include, for one or more second training iterations, training, based at least in part on a second regularization magnitude greater than the first regularization magnitude, the machine-learned model using one or more respective second training samples of the plurality of training samples.

29 Claims, 7 Drawing Sheets

Related U.S. Application Data continuation of application No. 17/564,860, filed on Dec. 29, 2021, now Pat. No. 11,450,096.

(60) Provisional application No. 63/145,830, filed on Feb. 4, 2021.

(58) Field of Classification Search
CPC .... G06N 3/092; G06N 3/0475; G06N 3/0454; G06N 3/0464; G06N 3/063; G06N 3/088; G06N 20/00; G06N 20/10; G06N 20/20; G06V 10/82; G06V 10/761; G06V 10/776
See application file for complete search history.

(56) References Cited

U.S. PATENT DOCUMENTS

| | | | |
|---|---|---|---|
| 10,210,860 B1 | 2/2019 | Ward et al. | |
| 10,217,060 B2 | 2/2019 | Yousefi'zadeh et al. | |
| 10,325,602 B2 | 6/2019 | Sak et al. | |
| 10,572,979 B2 | 2/2020 | Vogels et al. | |
| 10,769,766 B1 | 9/2020 | Padfield et al. | |
| 10,789,158 B2 | 9/2020 | Zlatarev et al. | |
| 10,909,457 B2 | 2/2021 | Tan et al. | |
| 10,922,816 B2 | 2/2021 | Huang et al. | |
| 11,138,471 B2 * | 10/2021 | Park | G06N 3/045 |
| 11,295,171 B2 * | 4/2022 | Lee | G06V 20/46 |
| 11,450,096 B2 * | 9/2022 | Tan | G06N 3/082 |
| 11,481,627 B2 * | 10/2022 | Qiu | G06N 3/08 |
| 11,755,883 B2 * | 9/2023 | Dai | G06V 10/454 706/27 |
| 11,790,264 B2 * | 10/2023 | Duerig | G06N 5/02 706/12 |
| 11,893,491 B2 | 2/2024 | Tan et al. | |
| 11,954,442 B2 * | 4/2024 | Liang | G06N 3/084 |
| 12,062,227 B2 * | 8/2024 | Tan | G06V 10/7747 |
| 12,079,695 B2 * | 9/2024 | Du | G06N 3/045 |
| 12,169,779 B2 * | 12/2024 | Sandler | G06N 3/084 |
| 12,210,845 B2 * | 1/2025 | Luong | G06N 3/08 |
| 2018/0293492 A1 | 10/2018 | Kalamkar et al. | |
| 2018/0293493 A1 | 10/2018 | Kalamkar et al. | |
| 2020/0104715 A1 | 4/2020 | Denolf et al. | |
| 2020/0234132 A1 | 7/2020 | Tan et al. | |
| 2021/0264322 A1 * | 8/2021 | Markhasin | G06V 10/80 |
| 2022/0011779 A1 | 1/2022 | Kim et al. | |
| 2022/0067146 A1 | 3/2022 | Cai et al. | |
| 2022/0083906 A1 | 3/2022 | Ong et al. | |
| 2022/0339969 A1 | 10/2022 | Hosu et al. | |
| 2023/0017808 A1 | 1/2023 | Tan et al. | |
| 2023/0153577 A1 | 5/2023 | Kim et al. | |
| 2023/0394781 A1 | 12/2023 | Hatamizadeh et al. | |
| 2024/0211764 A1 | 6/2024 | Tan et al. | |

FOREIGN PATENT DOCUMENTS

| | | |
|---|---|---|
| JP | 2017037392 | 2/2017 |
| JP | 2019-533257 | 11/2019 |
| WO | WO 2018156942 | 8/2018 |

OTHER PUBLICATIONS

Bello, "LambdaNetworks: Modeling Long-Range Interactions Without Attention.", arXiv:2102.08602v1, Feb. 17, 2021, 31 pages.
Bello, et al., "Revisiting Resnets: Improved Training and Scaling Strategies.", arXiv:2103.07579v1, Mar. 13, 2021, 18 pages.
Bengio, et al., "Curriculum Learning", Journal of the American Podiatry Association 60(1):6, Jan. 2009, 9 pages.
Brock, et al., "High-Performance Large-Scale Image Recognition Without Normalization", arXiv:2102.06171, Feb. 11, 2021, 22 pages.
Brown, et.al., "Language Models Are Few-Shot Learners", arXiv:2005.14165v4, Jul. 22, 2022, 75 pages.
Cai, et al., "ProxylessNAS: Direct Neural Architecture Search on Target Task and Hardware", arXiv:1812.00332v2, Feb. 23, 2019, 13 pages.
Chen, et al., "DetNAS: Neural Architecture Search on Object Detection", arXiv:1903.10979v4, Dec. 30, 2019, 13 pages.
Cubuk, et al., "RandAugment: Practical Automated Data Augmentation with a Reduced Search Space", arXiv:1909.13719v2, Nov. 14, 2019, 13 pages.
Dong, et al., "AutoHAS: Efficient HyperParameter and Architecture Search", arXiv preprint arXiv:2006.03656v3, Apr. 7, 2021, 12 pages.
Dosovitskiy, et al., "An Image is Worth 16x16 Words: Transformers for Image Recognition at Scale", arXiv:2010.11929v2, Jun. 3, 2021, 22 pages.
Elsken, et al., "Neural Architecture Search: A Survey", arXiv:1808.05377v3, Apr. 26, 2019, 21 pages.
Gupta, et al., "Accelerator-Aware Neural Network Design Using AutoML", arXiv:2003.02838vl, Mar. 5, 2020, 5 pages.
Gupta, et al., "EfficientNet-EdgeTPU: Creating Accelerator-Optimized Neural Networks with AutoML", ai.googleblog.com/2019/08/efficientnet-edgetpu-creating.html, Aug. 6, 2019, 5 pages.
He, et al., "Deep Residual Learning for Image Recognition", 2016 IEEE Conference on Computer Vision and Pattern Recognition, Las Vegas, Jun. 27-30, 2016, 770-778., 9 pages.
Hoffer, et al., "Mix & Match: Training Convnets with Mixed Image Sizes for Improved Accuracy, Speed and Scale Resiliency", arXiv:1908.08986v1, Aug. 12, 2019, 13 pages.
Howard, "Training Imagenet in 3 hours for USD 25; and CIFAR10 for USD 0.26", https://www.fast.ai/2018/04/30/dawnbench-fastai/, Apr. 30, 2018, 8 pages.
Huang, et al., "Deep Networks with Stochastic Depth", arXiv:1603.09382v3, Jul. 28, 2016, 16 pages.
Huang, et al., "Densely Connected Convolutional Networks", https://https://www.researchgate.net/publication/306885833_Densely_Connected_Convolutional_NetworksComputer Vision and Pattern Recognition Conference, Jul. 2017, 10 pages.
Huang, et al., "GPipe: Efficient Training of Giant Neural Networks Using Pipeline Parallelism", arXiv:1811.06965v5, Jul. 25, 2019, 11 pages.
International Preliminary Report on Patentability for PCT/US2021/065448, mailed Aug. 17, 2023, 13 pages.
International Search Report and Written Opinion for Application No. PCT/US2021/065448, mailed Jul. 19, 2022, 19 pages.
Karras, et al., "Progressive Growing of GANs for Improved Quality, Stability, and Variation", arXiv:1710.10196v3, Feb. 26, 2018, 26 pages.
Kolesnikov, et al., "Big Transfer (BiT): General Visual Representation Learning", arXiv:1912.11370v3, May 5, 2020, 28 pages.
Krause, et al., "Collecting a Large-Scale Dataset of Fine-Grained Cars", Second Workshop on Fine-Grained Visual Categorization, Stanford University, 2013, 2 pages.
Krizhevsky, et al., "Learning Multiple Layers of Features from Tiny Images", Technical Report, Apr. 8, 2009, 60 pages.
Li, et al., "Searching for Fast Model Families on Datacenter Accelerators", arXiv:2102.05610v1, Feb. 10, 2021, 13 pages.
Liu, et al., "Auto-DeepLab: Hierarchical Neural Architecture Search for Semantic Image Segmentation", arXiv:1901.02985v2, Apr. 6, 2019, 11 pages.
Mahajan, et al., "Exploring the Limits of Weakly Supervised Pretraining", arXiv:1805.00932v1, May 2, 2018, 23 pages.
Nilsback, et al., "Automated Flower Classification Over a Large Number of Classes", https://www.robots.ox.ac.uk/~vgg/publications/2008/Nilsback08/nilsback08.pdf, Indian Conference on Computer Vision, Graphics and Image Processing, pp. 722-729, 2008, 8 pages.
Press, et al., "Shortformer: Better Language Modeling Using Shorter Inputs", arXiv:2012.15832v2, Jun. 3, 2021, 13 pages.
Radosavovic, et al., "Designing Network Design Spaces", arXiv:2003.13678v1, Mar. 30, 2020, 12 pages.
Ridnik, et al., "TResNet: High Performance GPU-Dedicated Architecture", arXiv:2003.13630v3, Aug. 27, 2020, 12 pages.
Russakovsky, et al., "ImageNet Large Scale Visual Recognition Challenge", arXiv:1409.0575v3, Jan. 30, 2015, 43 pages.
Sandler, et al., "Mobilenetv2: Inverted Residuals and Linear Bottlenecks", arXiv:1801.04381v4, Mar. 21, 2019, 14 pages.

(56) References Cited

OTHER PUBLICATIONS

Sifre, et al., "Rigid-Motion Scattering for Image Classification", arXiv:1403.1687v1, Mar. 7, 2014, 19 pages.
Srinivas, et al., "Bottleneck Transformers for Visual Recognition", arXiv:2101.11605v2, Aug. 2, 2021, 11 pages.
Srivastava, et al., "Dropout: A Simple Way to Prevent Neural Networks from Overfitting", Journal of Machine Learning Research, 15(2014):1929-1958, Jun. 2014, 30 pages.
Tan, et al., "EfficienNet: Rethinking Model Scaling for Convolutional Neural Networks", arXiv:1905.11946v5, Sep. 11, 2020, 11 pages.
Tan, et al., "EfficientDet: Scalable and Efficient Object Detection", arXiv:1911.09070v7, Jul. 27, 2020, 10 pages.
Tan, et al., "EfficientNetV2: Smaller Models and Faster Training", arXiv:2104.00298v3, Jun. 23, 2021, 11 pages.
Tan, et al., "MixConv: Mixed Depthwise Convolutional Kernels" arXiv:1907.09595v3, Dec. 1, 2019, 13 pages.
Tan, et al., "Mnasnet: Platform-Aware Neural Architecture Search for Mobile", arXiv:1807.11626v3, May 29, 2019, 9 pages.
Tan, et al., "Toward Fast and Accurate Neural Networks for Image Recognition", https://ai.googleblog.com/2021/09/toward-fast-and-accurate-neural.html, Google AI Blog, Sep. 16, 2021, 6 pages.
Touvron et al., "Fixing the Train-Test Resolution Discrepancy: FixEfficientNet", arXiv:2003.08237v5, Nov. 18, 2020, 5 pages.
Touvron, et al., "Fixing the Train-Test Resolution Discrepancy", arXiv:1906.06423v4, Jan. 20, 2022, 14 pages.
Touvron, et al., "Training Data-Efficient Image Transformers & Distillation through Attention", arXiv:2012.12877v2, Jan. 15, 2021, 22 pages.
Watt et al., "11.6 Efficient Cross-Validation via Regularization", Sep. 5, 2020, https://jermwatt.github.io/machine_learning_refined/notes/ll_Feature_learning/1_1_6_Regularization.html, retrieved on Jun. 8, 2022, 11 pages.
Wightman, "Pytorch image model", https://rwightman.github.io/pytorch-image-models/, Accessed on Apr. 19, 2022, 3 pages.
Wu, et al., "FbNet: Hardware-Aware Efficient Convnet Design via Differentiable Neural Architecture Search", arXiv:1812.03443v3, May 24, 2019, 10 pages.
Xie, et al., "Self-training with Noisy Student Improves ImageNet Classification", arXiv:1911.04252v4, Jun. 19, 2020, 18 pages.
Xiong, et al., "MobileDets: Searching for Object Detection Architectures for Mobile Accelerators", arXiv:2004.14525v3, Mar. 31, 2021, 11 pages.
Yu, et al., "PDA: Progressive Data Augmentation for General Robustness of Deep Neural Networks", arXiv:1909.04839v3, Feb. 24, 2020, 10 pages.
Yuan, et al., "Tokens-to-Token ViT: Training Vision Transformers from Scratch on ImageNet", arXiv:2101.11986v3, Nov. 30, 2021, 10 pages.
Zhang, et al., "mixup: Beyond Empirical Risk Minimization", arXiv:1710.09412v2, Apr. 27, 2018, 13 pages.
Zhang, et al., "ResNeSt: Split-Attention Networks", arXiv:2004.08955v2, Dec. 23, 2020.
Zoph, et al., "Learning Transferable Architectures for Scalable Image Recognition", arXiv:1707.07012v4, Apr. 11, 2018, 14 pages.
Berg et al., "Birdsnap: Large-scale Fine-grained Visual Categorization of Birds," 2014 Institute of Electrical and Electronics Engineer Conference on Computer Vision and Pattern Recognition, Sep. 2014, 8 pages.
Bossard et al., "Food-10 I-Mining Discriminative Components with Random Forests," European Conference on Computer Vision, Sep. 2014, 16 pages.
Chollet, "Xception: Deep Learning with Depthwise Separable Convolutions," 2017 Institute of Electrical and Electronics Engineers Conference on Computer Vision and Pattern Recognition (CVPR), Jul. 2017, 1800-1807.
Cubuk et al., "AutoAugment: Learning Augmentation Strategies From Data," 2019 IEEE/CVF Conference on Computer Vision and Pattern Recognition (CVPR), Jun. 2019, 113-123.

Elfwing et al., "Sigmoid-Weighted Linear Units for Neural Network Function Approximation in Reinforcement Learning," arXiv:1702.03118v3, Nov. 2, 2017, 18 pages.
Gholami et al., "SqueezeNext: Hardware-Aware Neural Network Design," arXiv:1803.10615v2, Aug. 27, 2018, 12 pages.
Han et al., "Deep Compression: Compressing Deep Neural Networks with Pruning, Trained Quantization and Huffman Coding," arXiv:1510.00149v5, Feb. 15, 2016, 14 pages.
He et al., "AMC: AutoML for Model Compression and Acceleration on Mobile Devices," The European Conference on Computer Vision (ECCV), 2018, 17 pages.
He et al., "Mask R-CNN," 2017 Institute of Electrical and Electronics Engineers International Conference on Computer Vision (ICCV), Oct. 2017, 2980-2988.
Howard et al., "MobileNets: Efficient Convolutional Neural Networks for Mobile Vision Applications," arXiv:1704.04861v1, Apr. 17, 2017, 9 pages.
Hu et al., "Squeeze-and-Excitation Networks," 2018 IEEE/CVF Conference on Computer Vision and Pattern Recognition, Jun. 2018, 7132-7141.
Iandola et al., "SqueezeNet: AlexNet-level Accuracy with 50x Fewer Parameters and <0.5MB model size," https://arxiv.org/abs/1602.07360, Nov. 2016, 13 pages.
International Preliminary Report of Patentability in International Application No. for PCT/US2020/014839, mailed on Aug. 5, 2021, 9 pages.
International Search Report and Written Opinion in International Application No. for PCT/US2020/014839, mailed on May 7, 2020, 15 pages.
Ioffe et al., "Batch Normalization: Accelerating Deep Network Training by Reducing Internal Covariate Shift," Thirty-second International Conference on Machine Learning, Jun. 2015, 9 pages.
JP Office Action in Japanese Application No. 2021-542494, dated Oct. 11, 2022, 11 pages (with English Translation).
Kornblith et al., "Do Better ImageNet Models Transfer Better?" 2019 IEEE/CVF Conference on Computer Vision and Pattern Recognition (CVPR), Jun. 2019, 2661-2671.
Krizhevsky et al., "ImageNet Classification with Deep Convolutional Neural Networks," retrieved from URL <http://vision.cse.psu.edu/people/chrisF/deep-learning/Papers/KrizhevskyNIPS12Imagenet.pdf>, 2012, 9 pages.
Lin et al., "Feature Pyramid Networks for Object Detection," 2017 Institute of Electrical and Electronics Engineers Conference on Computer Vision and Pattern Recognition (CVPR), Jul. 2017, 936-944.
Lin et al., "ResNet with One-Neuron Hidden Layers is a Universal Approximator," arXiv:1806.10909v2, Jul. 4, 2018, 21 pages.
Liu et al., "Progressive Neural Architecture Search," European Conference on Computer Vision, Sep. 2018, pp. 19-35.
Loshchilov et al., "CMA-ES for Hyperparameter Optimization of Deep Neural Networks", arXiv:1604.07269v1, Apr. 25, 2016, 8 pages.
Lu et al., "The Expressive Power of Neural Networks: A View from the Width," https://arxiv.org/abs/1709.02540, last revised Nov. 2017, 21 pages.
Ma et al., "ShuffleNet V2: Practical Guidelines for Efficient CNN Architecture Design," arXiv:1807.11164v1, Jul. 30, 2018, 19 pages.
Maji et al., "Fine-Grained Visual Classification of Aircraft," arXiv:1306.5151v1, Jun. 21, 2013, 6 pages.
Ngiam et al., "Domain Adaptive Transfer Learning with Specialist Models," arXiv:1811.07056v2, Dec. 11, 2018, 10 pages.
Notice of Allowance in Japanese Application No. 2021-542494, mailed on Apr. 24, 2023, 5 pages (with English translation).
Notice of Allowance in Korean Application No. 10-2021-7023377, mailed on Apr. 9, 2025, 3 pages (with English translation).
Office Action in Chinese Application No. 202080010508.3, dated Jul. 1, 2024, 12 pages (with English translation).
Office Action in European Application No. 20708313.0, mailed on Sep. 4, 2023, 6 pages.
Office Action in Japanese Application No. 2023-08564.5, mailed on Sep. 9, 2024, 8 pages (with English Translation).
Office Action in Korean Application No. 1020217023377, mailed Jul. 30, 2024, 15 pages with English Translation).

(56) References Cited

OTHER PUBLICATIONS

Parkhi et al., "Cats and Dogs," 2012 Institute of Electrical and Electronics Engineers Conference on Computer Vision and Pattern Recognition, Jun. 2012, 3498-3505.

Raghu et al., "On the Expressive Power of Deep Neural Networks," arXiv:1606.05336v6, Jun. 18, 2017, 24 pages.

Ramachandran et al., "Searching for Activation Functions," https://arxiv.org/abs/1710.05941, Oct. 2017, 13 pages.

Real et al., "Regularized Evolution for Image Classifier Architecture Search," AAAI, Jul. 2019, 4780- 4789.

Sharir et al., "On the Expressive Power of Overlapping Architectures of Deep Learning," arXiv:1703.02065v4, Feb. 24, 2018, 24 pages.

Szegedy et al., "Going deeper with convolutions," 2015 Institute of Electrical and Electronics Engineers Conference on Computer Vision and Pattern Recognition (CVPR), Jun. 2015, 9 pages.

Szegedy et al., "Inception-v4, Inception-ResNet and the Impact of Residual Connections on Learning," AAAI, Feb. 2017, 4278-4284.

Szegedy et al., "Rethinking the Inception Architecture for Computer Vision," 2016 Institute of Electrical and Electronics Engineers Conference on Computer Vision and Pattern Recognition (CVPR), Jun. 2016, 2818-2826.

Xie et al., "Aggregated Residual Transformations for Deep Neural Networks," arXiv:1611.05431v2, Apr. 11, 2017, 10 pages.

Yang et al., "NetAdapt: Platform-Aware Neural Network Adaptation for Mobile Applications," European Conference on Computer Vision, Oct. 2018, 16 pages.

Yu et al., "Slimmable Neural Networks", arXiv:1812.08928v1, Dec. 21, 2018, 12 pages.

Zagoruyko et al., "Wide Residual Networks", arXiv:1605.07146v4, Jun. 14, 2017, 15 pages.

Zhang et al., "PolyNet: A Pursuit of Structural Diversity in Very Deep Networks," arXiv:1611.05725v2, Jul. 17, 2017, 9 pages.

Zhang et al., "ShuffleNet: An Extremely Efficient Convolutional Neural Network for Mobile Devices," 2018 IEEE/CVF Conference on Computer Vision and Pattern Recognition, Jun. 2018, 6848-6856.

Zhou et al., "Learning Deep Features for Discriminative Localization," arXiv:1512.04150v1, Dec. 14, 2015, 10 pages.

Zoph et al., "Neural Architecture Search with Reinforcement Learning,", arXiv:1611.01578v2, Feb. 15, 2017, 16 pages.

* cited by examiner

SYSTEMS AND METHODS FOR PROGRESSIVE LEARNING FOR MACHINE-LEARNED MODELS TO OPTIMIZE TRAINING SPEED

RELATED APPLICATIONS

The present application is a continuation of U.S. application Ser. No. 17/943,880 having a filing date of Sep. 13, 2022, which is a continuation of U.S. application Ser. No. 17/564,860 having a filing date of Dec. 29, 2021, which claims the benefit of U.S. Provisional Application Ser. No. 63/145,830 filed Feb. 4, 2021. Applicant claims priority to and the benefit of each of such applications and incorporate all such applications herein by reference in its entirety.

FIELD

The present disclosure relates generally to progressive learning of machine-learned models. More particularly, the present disclosure relates to progressive adjustment of regularization during training of a machine-learned model to optimize training speed.

BACKGROUND

Recent advancements in machine learning have substantially increased the size and complexity of both machine-learned models (e.g., neural networks, etc.) and the data used to train them. As an example, the training of state-of-the-art deep learning models can sometimes necessitate the utilization of thousands of graphics processing units for weeks at a time, therefore presenting a prohibitively expensive computational cost. Other networks may train quickly but come with expensive overhead as regards a large number of parameters As such, a method that increases training speed and parameter efficiency would substantially increase the availability of computational resources for other tasks.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for efficient machine-learned model training. The method can include obtaining, by a computing system comprising one or more computing devices, a plurality of training samples for a machine-learned model. The method can include, for one or more first training iterations, training, by the computing system based at least in part on a first regularization magnitude configured to control a relative effect of one or more regularization techniques, the machine-learned model using one or more respective first training samples of the plurality of training samples. The method can include, for one or more second training iterations, training, by the computing system based at least in part on a second regularization magnitude greater than the first regularization magnitude, the machine-learned model using one or more respective second training samples of the plurality of training samples.

Another example aspect of the present disclosure is directed to a computing system for determination of models with optimized training speed. The computing system can include one or more processors. The computing system can include one or more tangible, non-transitory computer readable media storing computer-readable instructions that when executed by the one or more processors cause the one or more processors to perform operations. The operations can include generating a first machine-learned model from a defined model search space, wherein the defined model search space comprises one or more searchable parameters, wherein the first machine-learned model comprises a one or more first values for the one or more searchable parameters. The operations can include performing a model training process on the first machine-learned model to obtain first training data descriptive of a first training speed. The operations can include generating a second machine-learned model from the defined model search space based at least in part on the first training data, wherein the second machine-learned model comprises one or more second values for the one or more searchable parameters, wherein at least one of the one or more second values is different than the one or more first values. The operations can include performing the model training process on the second machine-learned model to obtain second training data descriptive of a second training speed, wherein the second training speed is faster than the first training speed.

Another example aspect of the present disclosure is directed to one or more tangible, non-transitory computer readable media storing computer-readable instructions that when executed by the one or more processors cause the one or more processors to perform operations. The operations can include generating a first machine-learned model from a defined model search space, wherein the defined model search space comprises one or more searchable parameters, wherein the first machine-learned model comprises a one or more first values for the one or more searchable parameters. The operations can include performing a model training process on the first machine-learned model to obtain first training data descriptive of a first training speed. The operations can include generating a second machine-learned model from the defined model search space based at least in part on the first training data, wherein the second machine-learned model comprises one or more second values for the one or more searchable parameters, wherein at least one of the one or more second values is different than the one or more first values, wherein the second machine-learned model comprises a plurality of sequential model stages, wherein each model stage comprises one or more model layers, and wherein a first model stage comprises fewer model layers than a second model stage of the plurality of model stages. The operations can include performing the model training process on the second machine-learned model to obtain second training data descriptive of a second training speed, wherein the second training speed is faster than the first training speed.

Another example aspect is directed to one or more tangible, non-transitory computer readable media that store: a machine-learned model, comprising: a first sequence of a plurality of Fused-MBConv stages; and a second sequence of a plurality of MBConv stages, wherein the second sequence of the plurality of MBConv stages follows the first sequence of the plurality of Fused-MBConv stages; and computer-readable instructions that when executed by the one or more processors cause the one or more processors to perform operations, the operations comprising: obtaining a model input; and processing the model input with the machine-learned model to generate a model output. In some implementations, the plurality of Fused-MBConv stages consists of three Fused-MBConv stages. In some implementations, the three Fused-MBConv stages comprises a first, a second, and a third Fused-MBConv stage that have 2, 4, and 4 layers, respectively. In some implementations, the three Fused-MBConv stages comprises a first, a second, and a third Fused-MBConv stage that have 24, 48, and 64 channels, respectively. In some implementations, the three Fused-MBConv stages comprises a first, a second, and a third Fused-MBConv stage that each have 3×3 kernels.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1A:
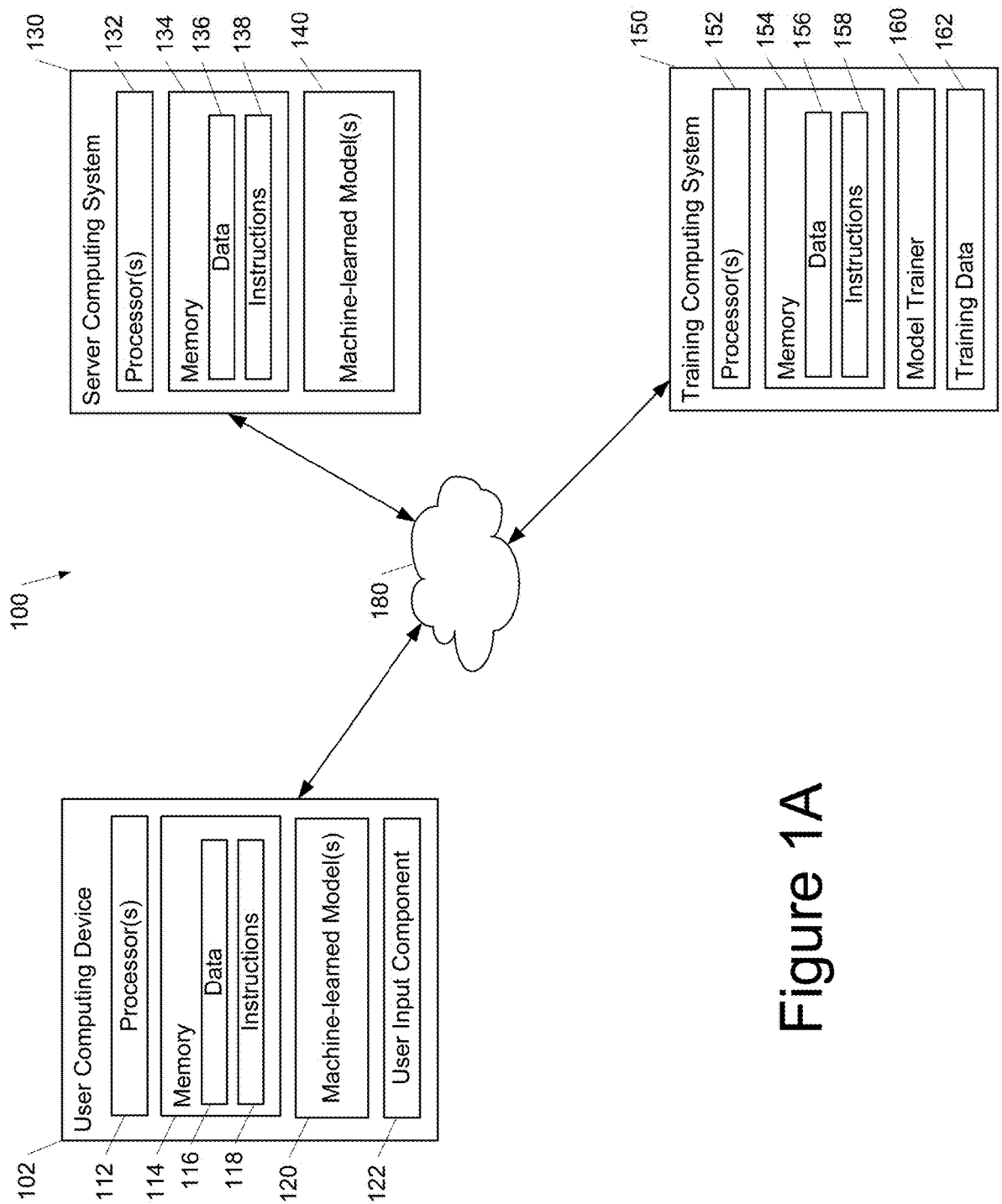
FIG. 1A depicts a block diagram of an example computing system that performs model training using progressive regularization according to example embodiments of the present disclosure.

Generally, the present disclosure is directed to progressive learning of machine-learned models. More particularly, the present disclosure relates to progressive adjustment of regularization during training of a machine-learned model to optimize training speed. As an example, a plurality of training samples (e.g., training images, training datasets, etc.) can be obtained for a machine-learned model (e.g., a convolutional neural network, a deep learning network, etc.). For one or more training iterations, the machine-learned model can be trained using one or more of these training samples based on a first regularization magnitude. The first regularization magnitude can be configured to control a relative effect of one or more regularization techniques (e.g., model dropout(s), training data augmentation, etc.). For one or more second training iterations, the model can be trained based at least in part on a second regularization magnitude that is greater than the first regularization magnitude. Additionally, in some implementations, the complexity of the training samples (e.g., an image size, a dataset size, etc.) can be progressively increased in a substantially similar manner. By initially training the model with a relatively weak level of regularization and data complexity, and then increasing both parameters progressively, systems and methods of the present disclosure substantially reduce the computational resources required during earlier training iterations, therefore increasing the accuracy of the model while simultaneously increasing the overall speed of training the model.

To further increase the training efficiency of machine-learned models, the architecture of the models can be selected based an architecture search (e.g., neural architecture search, etc.) that emphasizes training efficiency. As an example, a first machine-learned model can be generated from a defined model search space that includes one or more parameters. More particularly, the first machine-learned model can include one or more values for the one or more parameters. A model training process (e.g., the previously described progressive regularization, etc.) can be applied to the first machine-learned model to obtain training data descriptive of a first training speed. Based at least in part on the first training data, a second machine-learned model can be generated from the defined model search space that includes one or more second values different than the one or more first values. The model training process can be performed on the second machine-learned model to obtain second training data. The second training data can describe a second training speed faster than the first training speed. In such fashion, an architecture search technique can be utilized to optimize for training speed, therefore significantly increasing the overall training speed of the machine-learned model(s).

In some implementations, the complexity of the training data can be progressively increased alongside the regularization magnitude during training. As an example, a first complexity (e.g., an image size, etc.) can be determined for a first set of training images (e.g., 280×280 pixels, etc.). The first set of training images can be used in a training process to train a machine-learned model at a first regularization magnitude. A second complexity can be determined for a second set of training images (e.g., 1080×720 pixels, etc.) that is greater than the first complexity, alongside a second regularization magnitude greater than the first. The second set of training images can be used in the training process to train the machine-learned model based on the second regularization magnitude. In such fashion, both the accuracy and training efficiency (e.g., speed, number of training epochs, etc.) can be increased substantially.

In some implementations, training complexity can be, represent, or otherwise describe a difficulty associated with processing a training sample. As an example, the training sample can be image data. Increasing the training complexity of the image data can include augmenting one or more characteristics of the image data (e.g., increasing resolution, increasing color of the image data, increasing a number of image features, adding noise to the image, rotating the image, augmenting the image with a second image, etc.). As another example, if the training sample is a polygonal mesh, increasing the training complexity of the polygonal mesh may include increasing a number of included polygons. As such, it should be broadly understood that adjustment of the training complexity of a training sample can be accomplished in any way that adjusts the difficulty associated with processing of the training sample by the respective machine-learned model.

In some implementations, the model(s) of the present disclosure can be or otherwise include attention-based models. As an example, the model(s) of the present disclosure may include one or more self-attention mechanisms, and/or one or more attention-level layers. For example, the model(s) of the present disclosure may be or otherwise include transformer model(s). In some implementations, regularization technique(s) may include augmentation of the attention scope in these models. For example, a regularization technique may augment a full self-attention layer in some fashion (e.g., adjustment of attentional weight(s), modification of the attention architecture, modifying scope in which attention is determined between attention heads of the layer, etc.).

The systems and methods described herein provide a number of technical effects and benefits. As one example, by progressively increasing the magnitude of regularization during training, the systems and methods of the present disclosure can substantially reduce the overall complexity and computational resources required to train a model (e.g., less processing power, less memory usage, less power consumption, etc.), as compared to, for example, conventional training techniques which utilize a continuous magnitude of regularization. Thus, the proposed techniques can enable more efficient training of machine learning models which uses fewer computational resources.

Furthermore, by generating a model with an architecture optimized for training speed and efficiency, systems and methods of the present disclosure can further reduce the overall time and computational resources required for model training. For example, by leveraging an architecture search technique to generate a segmented machine-learned model with increasing complexity (e.g., number of layers, etc.) per segment, the systems and methods of the present disclosure can further enhance the efficacy of progressive regularization during training, therefore reducing computational resource requirements even further.

As another example technical effect and benefit, progressive adjustment of training complexity (e.g., a size of training data, a relative "difficulty" of correct processing of training data, etc.) is generally known to increase training speed. However, it can also lead to reduced model accuracy. By progressively increasing the regularization of training in a corresponding manner, increases in training speed from progressive training complexity can be enhanced, while also ameliorating any reductions in model accuracy. As such, the progressive regularization of the model during training can enhance other methods for increasing training speed while also substantially reducing or eliminating any reduction in accuracy from those methods.

As another example technical effect and benefit, meta-learning (e.g., neural architecture search, etc.) techniques often utilize "early stop" techniques when generating machine-learned model(s). For example, a meta-learning technique may implement an early halt to cycle of training iterations based on the initial results of the training iterations. By utilizing a progressive regularization technique, earlier training iterations in a training cycle are less computationally expensive. By reducing the overall computational cost associated with early training iterations, systems and methods of the present disclosure can substantially reduce the negative effects associated with early stops in meta-learning techniques (e.g., wasted compute resources, etc.).

Thus, example aspects of the present disclosure are directed to a new family of convolutional networks that have faster training speed and better parameter efficiency than previous models. To develop these models, example systems described herein can use a combination of training-aware neural architecture search and scaling, to jointly optimize training speed and parameter efficiency. The models were searched from the search space enriched with new ops such as Fused-MBConv. Experiments show that the models proposed herein train much faster than state-of-the-art models while being up to 6.8× smaller.

Furthermore, training of models can be further sped up by progressively increasing the image size during training. However, this often causes a drop in accuracy. To compensate for this accuracy drop, the present disclosure proposes an improved method of progressive learning, which adaptively adjusts regularization (e.g. data augmentation) e.g., in addition to image size.

More particularly, training efficiency has gained significant interests recently. For instance, NFNets aim to improve training efficiency by removing the expensive batch normalization; Several recent works focus on improving training speed by adding attention layers into convolutional networks (ConvNets); Vision Transformers improves training efficiency on large-scale datasets by using Transformer blocks.

However, these methods often come with expensive overhead on large parameter size. In contrast, the present disclosure uses an combination of training-aware neural architecture search (NAS) and scaling to improve both training speed and parameter efficiency. Given the parameter efficiency of certain models known as EfficientNets (see Tan, M. and Le, Q. V. EfficientNet: Rethinking model scaling for convolutional neural networks. ICML, 2019a) the present disclosure systematically studying the training bottlenecks in EfficientNets. These studies shows in EfficientNets: (1) training with very large image sizes is slow; (2) depthwise convolutions are slow in early layers. (3) equally scaling up every stage is sub-optimal.

Based on these observations, the present disclosure provides a search space enriched with additional operations such as Fused-MBConv. The present disclosure also applies training-aware NAS and scaling to jointly optimize model accuracy, training speed, and parameter size. The resulting networks, which can be referred to as EfficientNetV2, train up to 4× faster than prior models, while being up to 6.8× smaller in parameter size.

In some example implementations, training can be further sped up by progressively increasing image size during training. Many previous works have used smaller image sizes in training; however, they keep the same regularization for all image sizes, causing a drop in accuracy. Thus, keeping the same regularization for different image sizes is not ideal: for the same network, small image size leads to small network capacity and thus requires weak regularization; vice versa, large image size requires stronger regularization to combat overfitting.

Based on this insight, the present disclosure proposes an improved method of progressive learning: in the early training epochs, the network can be trained with small image size and weak regularization (e.g., dropout and data augmentation), then image size can gradually be increased and stronger regularization can be added. This approach can speed up the training without causing accuracy drop.

With the improved progressive learning, example implementations of the proposed EfficientNetV2 achieves strong results on ImageNet, CIFAR-10, CIFAR-100, Cars, and Flowers dataset. On ImageNet, EfficientNet V2 achieves 85.7% top-1 accuracy while training 3×-9× faster and being up to 6.8× smaller than previous models. The EfficientNetV2 and progressive learning also make it easier to train models on larger datasets. For example, ImageNet21k is about 10× larger than ImageNet ILSVRC2012, but the EfficientNetV2 can finish the training within two days using moderate computing resources of 32 TPUv3 cores. By pretraining on the public ImageNet21k, the EfficientNetV2 achieves 87.3% top-1 accuracy on ImageNet ILSVRC2012, outperforming the recent ViT-L/16 by 2.0% accuracy while training 5×-11× faster.

Thus, the present disclosure provides the following advances: EfficientNetV2, a new family of smaller and faster models. Found by our training-aware NAS and scaling, EfficientNetV2 outperform previous models in both training speed and parameter efficiency. An improved method of progressive learning, which adaptively adjusts regularization along with image size. The method speeds up training, and simultaneously improves accuracy. The proposed approaches demonstrate up to 11× faster training speed and up to 6.8× better parameter efficiency on ImageNet, CIFAR, Cars, and Flowers dataset, than prior art.

Example EfficientNetV2 Architecture Design

Figure 2A:
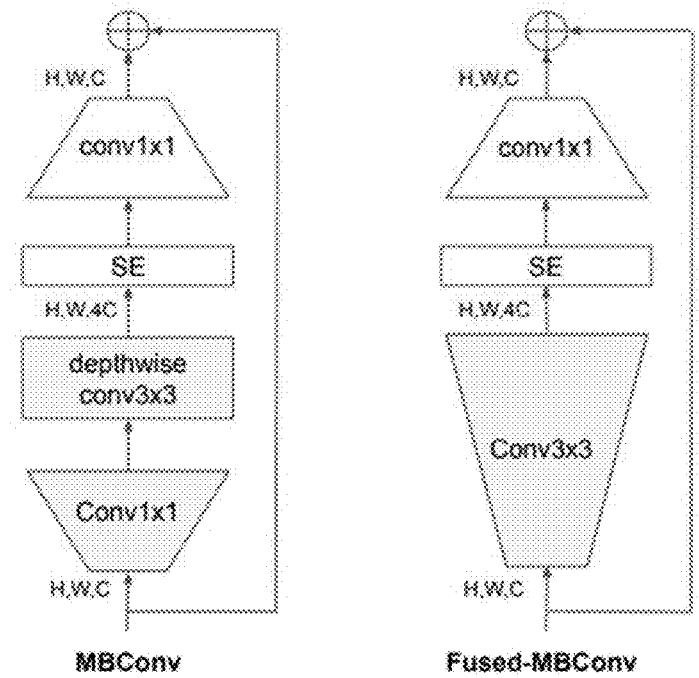
FIG. 2A shows Fused-MBConv and MBConv architectures according to example embodiments of the present disclosure.

This section studies the training bottlenecks of EfficientNet and introduces the proposed training-aware NAS and scaling, as well as EfficientNetV2 models.
Review of EfficientNet EfficientNet is a family of models that are optimized for FLOPs and parameter efficiency. It leverages NAS to search for the baseline EfficientNet-B0 that has better trade-off on accuracy and FLOPs. The baseline model is then scaled up with a compound scaling strategy to obtain a family of models B1-B7. While recent works have claimed large gains on training or inference speed, they are often worse than EfficientNet in terms of parameters and FLOPs efficiency. The present disclosure improves the training speed while maintaining the parameter efficiency.
Understanding Training Efficiency The section describes the training bottlenecks of EfficientNet (henceforth called EfficientNetV1) and a few simple techniques to improve training speed. Training with very large image sizes is slow: As pointed out by previous works, EfficientNetv1's large image size results in significant memory usage. Since the total memory on GPU/TPU is fixed, these models are generally trained with smaller batch size, which drastically slows down the training. A simple improvement is to apply FixRes, by using a smaller image size for training than for inference. Smaller image size leads to less computations and enables large batch size, and thus improves training speed by up to 2.2×. Using smaller image size for training also leads to slightly better accuracy. In some implementations, no layers are finetuned after training. Depthwise convolutions are slow in early layers but effective in later stages: Another training bottleneck of EfficientNetv1 comes from the extensive depthwise convolutions. Depthwise convolutions have fewer parameters and FLOPs than regular convolutions, but they often cannot fully utilize modern accelerators. Recently, Fused-MBConv has been used to better utilize mobile or server accelerators. Fused-MBConv is described in Gupta, S. and Tan, M. EfficientNet-EdgeTPU: Creating accelerator-optimized neural networks with automl. https://ai.googleblog.com/2019/08/efficient-netedgetpu-creating.html, 2019. Fused-MBConv replaces the depthwise conv3×3 and expansion conv1×1 in MBConv with a single regular conv3×3. MBConv is described in Sandler et al., Mobilenetv2: Inverted residuals and linear bottlenecks. CVPR, 2018 and Tan, M. and Le, Q. V. EfficientNet: Rethinking model scaling for convolutional neural networks. ICML, 2019a. The Fused-MBConv and MBConv architectures are shown in FIG. 2A.

To systematically compare these two building blocks, example experiments gradually replaced the original MBConv in EfficientNet-B4 with Fused-MBConv. When applied in early stage 1-3, Fused-MBConv can improve training speed with a small overhead on parameters and FLOPs, but if we replace all blocks with Fused-MBConv (stage 1-7), then it significantly increases parameters and FLOPs while also slowing down the training. Finding the right combination of these two building blocks, MBConv and Fused-MBConv, is non-trivial, which is a problem solved by the present disclosure through the use of neural architecture search to automatically search for the best combination. Equally scaling up every stage is sub-optimal: EfficientNetv1 equally scales up all stages using a simple compound scaling rule. For example, when depth coefficient is 2, then all stages in the networks would double the number of layers. However, these stages are not equally contributed to the training speed and parameter efficiency. Example implementations of the present disclosure use a non-uniform scaling strategy to gradually add more layers to later stages. In addition, v1 EfficientNets aggressively scale up image size, leading to large memory consumption and slow training. To address this issue, example implementations of the present disclosure slightly modify the scaling rule and restrict the maximum image size to a smaller value. Example Training-Aware NAS and Scaling Example implementations of the present disclosure provide multiple design choices for improving training speed. To search for the best combinations of those choices, this section proposes a training-aware NAS. NAS Search: An example training-aware NAS framework proposed by the present disclosure aims to jointly optimize accuracy, parameter efficiency, and training efficiency on modern accelerators. Specifically, the NAS uses EfficientNet as its backbone. The search space can be a stage-based factorized space similar to Tan et al., Mnasnet: Platform-aware neural architecture search for mobile. CVPR, 2019, but which consists of the design choices for convolutional operation types {MBConv, Fused-MBConv}, number of layers, kernel size {3×3, 5×5}, expansion ratio {1, 4, 6}. On the other hand, the search space size can optionally be reduced by (1) removing unnecessary search options such as pooling skip ops, since they are never used in the original EfficientNets; (2) reusing the same channel sizes from the backbone as they are already searched in the original EfficientNets. Since the search space is smaller, the search process can apply reinforcement learning or simply random search on much larger networks that have comparable size as EfficientNet-B4. Specifically, an example search approach can sample up to 1000 models and train each model about 10 epochs with reduced image size for training. An example search reward can combine the model accuracy A, the normalized training step time S, and the parameter size P, using a simple weighted product $A \cdot S^w \cdot P^v$, where $w=-0.07$ and $v=-0.05$ are empirically determined to balance the trade-offs.

The table below shows one example architecture for the searched model EfficientNetV2-S. Compared to the EfficientNet backbone, the proposed searched EfficientNetV2 has several major distinctions: (1) The first difference is EfficientNetV2 extensively uses both MBConv and the newly added fused-MBConv in the early layers. (2) Secondly, EfficientNetV2 prefers smaller expansion ratio for MBConv since smaller expansion ratios tend to have less memory access overhead. (3) Thirdly, EfficientNetV2 prefers smaller 3×3 kernel sizes, but it adds more layers to compensate the reduced receptive field resulted from the smaller kernel size. (4) Lastly, EfficientNetV2 completely removes the last stride-1 stage in the original EfficientNet, perhaps due to its large parameter size and memory access overhead.

EfficientNetV2-S Architecture:

| Stage | Operator | Stride | #Channels | #Layers |
|---|---|---|---|---|
| 0 | Conv3x3 | 2 | 24 | 1 |
| 1 | Fused-MBConv1, k3x3 | 1 | 24 | 2 |
| 2 | Fused-MBConv4, k3x3 | 2 | 48 | 4 |
| 3 | Fused-MBConv4, k3x3 | 2 | 64 | 4 |
| 4 | MBConv4, k3x3, SE0.25 | 2 | 128 | 6 |
| 5 | MBConv6, k3x3, SE0.25 | 1 | 160 | 9 |
| 6 | MBConv6, k3x3, SE0.25 | 2 | 256 | 15 |
| 7 | Conv1x1 & Pooling & FC | — | 1280 | 1 |

Another example architecture is shown in the table below:

ETNet-S Architecture:

| Stage | Operator | Stride | #Channels | #Layers |
|---|---|---|---|---|
| 1 | Conv3x3 | 2 | 32 | 1 |
| 2 | Fused-MBConv1, k3x3 | 1 | 24 | 2 |
| 3 | Fused-MBConv4, k3x3 | 2 | 48 | 4 |
| 4 | Fused-MBConv4, k3x3 | 2 | 64 | 4 |
| 5 | MBConv4, k3x3, SE | 2 | 128 | 6 |
| 6 | MBConv6, k5x5, SE | 1 | 160 | 6 |
| 7 | MBConv6, k5x5, SE | 2 | 272 | 8 |
| 8 | MBConv6, k3x3, SE | 1 | 448 | 2 |
| 9 | Conv1x1 & Pooling & FC | — | 1792 | 1 |

EfficientNetV2 Scaling: Some example implementations can scale up EfficientNetV2-S to obtain EfficientNetV2-M/L using similar compound scaling as described in EfficientNetv1, with a few additional optimizations: (1) the maximum inference image size can be restricted to 480, as very large images often lead to expensive memory and training speed overhead; (2) as a heuristic, more layers can gradually be added to later stages (e.g., stage 5 and 6) in order to increase the network capacity without adding much runtime overhead.

Example Progressive Learning Approaches

Example Motivation

As discussed in the previous section, image size plays an important role in training efficiency. In addition to FixRes, many other works dynamically change image sizes during training, but they often cause a drop in accuracy. This accuracy drop likely comes from the unbalanced regularization: when training with different image sizes, it is also best to also adjust the regularization strength accordingly (instead of using a fixed regularization as in previous works). In fact, it is common that large models require stronger regularization to combat overfitting: for example, EfficientNet-B7 uses larger dropout and stronger data augmentation than the B0. The present disclosure proposes that even for the same network, smaller image size leads to smaller network capacity and thus needs weaker regularization; vice versa, larger image size leads to more computations with larger capacity, and thus more vulnerable to overfitting.

Example Progressive Learning with Adaptive Regularization

One example training process with improved progressive learning is as follows: in the early training epochs, the network is trained with smaller images and weak regularization, such that the network can learn simple representations easily and fast. Then, image size can be gradually increased but learning is also made more difficult by adding stronger regularization.

Formally, suppose the whole training has N total steps, the target image size is $S_e$, with a list of regularization magnitude $\Phi_e = \{\phi_e^k\}$, where k represents a type of regularization such as dropout rate or mixup rate value. Some example implementations divide the training into M stages: for each stage $1 \leq i \leq M$, the model can be trained with image size $S_i$ and regularization magnitude $\Phi_i = \{\phi_i^k\}$. The last stage M would use the targeted image size $S_e$ and regularization $\Phi_e$. For simplicity, some example implementations heuristically pick the initial image size $S_0$ and regularization $\Phi_0$, and then use a linear interpolation to determine the value for each stage. One example Algorithm is provided below. At the beginning of each stage, the network will inherit all weights from the previous stage. Unlike transformers, whose weights (e.g., position embedding) may depend on input length, ConvNet weights are independent to image sizes and thus can be inherited easily.

Example Algorithm for Progressive Learning with Adaptive Regularization

Input: Initial image size $S_0$ and regularization $\{\phi_0^k\}$.
Input: Final image size $S_e$ and regularization $\{\phi_e^k\}$.
Input: Number of total training steps N and stages M.
for i = 0 to M − 1 do $\quad$ Image size: $S_i \leftarrow S_0 + (S_e - S_0) \cdot \dfrac{i}{M-1}$ $\quad$ Regularization: $R_i \leftarrow \left\{ \phi_i^k = \phi_0^k + (\phi_e^k - \phi_0^k) \cdot \dfrac{i}{M-1} \right\}$ $\quad$ Train the model for $\dfrac{N}{M}$ steps with $S_i$ and $R_i$.

end for

Example implementations of the proposed progressive learning are generally compatible to any existing regularization. As examples, the following types of regularization can be progressively adapted as described herein:

Dropout: a network-level regularization, which reduces co-adaptation by randomly dropping channels. Progressive learning can be applied to adjust the dropout rate γ. Dropout is described in Srivastava et al. Dropout: a simple way to prevent neural networks from overfitting. *The Journal of Machine Learning Research,* 15 (1): 1929-1958, 2014.

RandAugment: a per-image data augmentation, with adjustable magnitude ε. Progressive learning can be applied to adjust the magnitude. RandAugment is described at Cubuk et al., Randaugment: Practical automated data augmentation with a reduced search space. ECCV, 2020.

Mixup: a cross-image data augmentation. Given two images with labels $(x_i, y_i)$ and $(x_j, y_j)$, it combines them with mixup ratio $\lambda: \tilde{x}_i = \lambda x_j + (1-\lambda)x_i$ and $\tilde{y}_i = \lambda y_j + (1-\lambda)y_i$. Progressive learning can be applied to adjust mixup ratio λ during training. Mixup is described at Zhang et al., Mixup: Beyond empirical risk minimization. ICLR, 2018.

Example Devices and Systems

FIG. 1A depicts a block diagram of an example computing system 100 that performs model training using progressive regularization according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., for parallel progressive regularization training across multiple instances of the model).

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a classification service, a prediction service, etc.). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. As an example, the training data 162 can include a plurality of training samples (e.g., training images, training datasets, etc.) for a machine-learned model (e.g., model(s) 120, model (s0 140, etc.). For one or more training iterations, the machine-learned model(s) 120/140 can be trained using one or more of these training samples 162 based on a first regularization magnitude (e.g., using the model trainer 160). The first regularization magnitude can be configured for the model trainer 160 to control a relative effect of one or more regularization techniques (e.g., model dropout(s), training data augmentation, etc.). For one or more second training iterations, the model(s) 120/140 can be trained by the model trainer 160 based at least in part on a second regularization magnitude that is greater than the first regularization magnitude. Additionally, in some implementations, the complexity of the training samples 162 (e.g., an image size, a dataset size, etc.) can be progressively increased in a substantially similar manner (e.g., using the model trainer 160). By increasing the regularization magnitude progressively over a number of training iterations, the accuracy of the model(s) 120/140 can be increased while simultaneously increasing the overall training efficiency of the model(s) 120/140.

In some implementations, if a user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
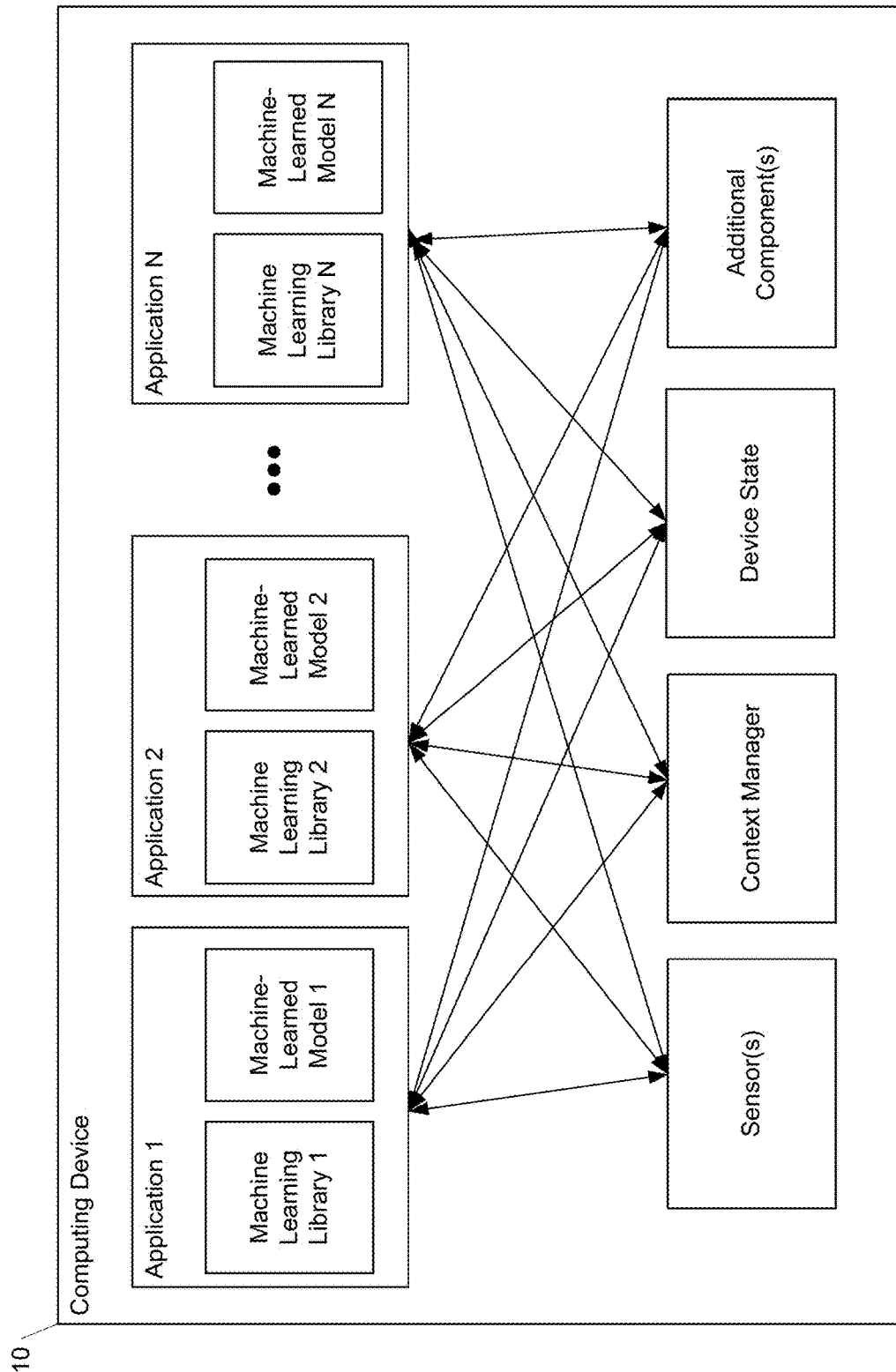
FIG. 1B depicts a block diagram of an example computing device that performs model training using progressive regularization according to example embodiments of the present disclosure.

FIG. 1B depicts a block diagram of an example computing device 10 that performs model training using progressive regularization according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
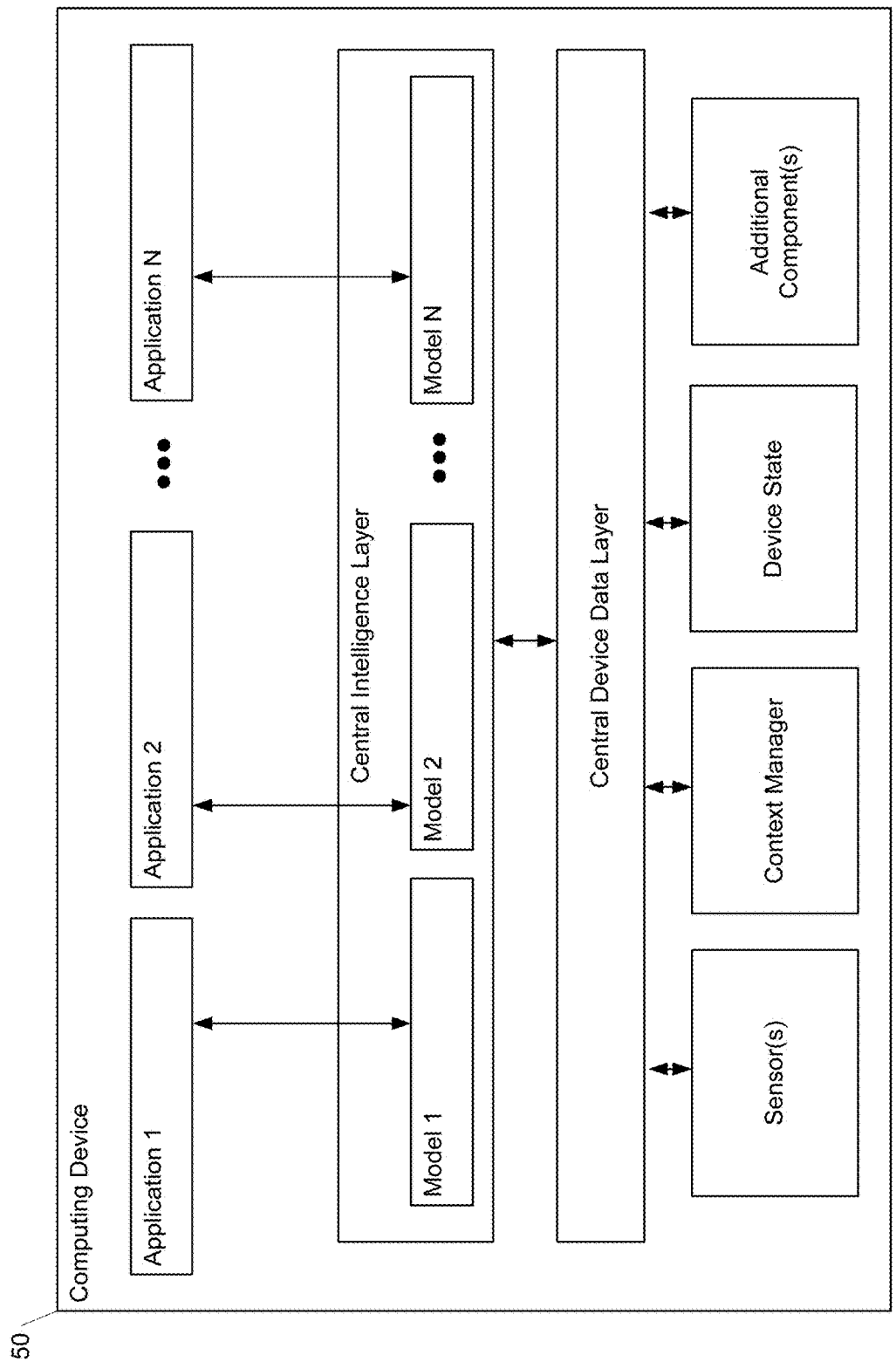
FIG. 1C depicts a block diagram of an example computing device that performs generation of machine-learned models with optimized training speed according to example embodiments of the present disclosure.

FIG. 1C depicts a block diagram of an example computing device 50 that performs generation of machine-learned models with optimized training speed according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2B:
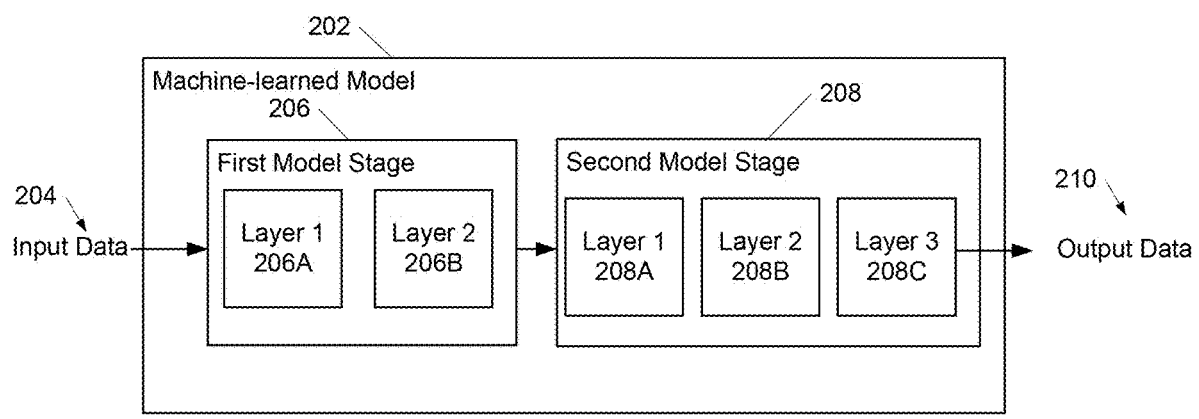
FIG. 2B depicts a block diagram of an example machine-learned model generated through an architecture search technique to emphasize training speed according to example embodiments of the present disclosure.

FIG. 2B depicts a block diagram of an example machine-learned model 200 generated through an architecture search technique to emphasize training speed according to example embodiments of the present disclosure. In some implementations, the machine-learned model 202 is trained to receive a set of input data 204 (e.g., image data, statistical data, video data, etc.) and, as a result of receipt of the input data 204, provide output data 210. More particularly, the machine-learned model 202 can include a plurality of stages. The machine-learned model 202 can include a first model stage 206 and a second model stage 208.

More particularly, the machine-learned model 202 can be generated using a neural architecture search method that is configured to emphasize training speed. As an example, the model can include two stages (e.g., first model stage 206, second model stage 208, etc.). The first model stage 206 can include two model layers 206A and 206B (e.g., convolutional layers, fused convolutional layers, etc.). The second model stage 208 can include three layers 208A-208C.

More particularly, the architecture of the machine-learned model 202 can be configured to facilitate model training using a progressively increasing regularization magnitude (e.g., a degree in which a regularization technique affects the training of the model 202, etc.). As an example, the machine-learned model 202 can be trained using an initial regularization magnitude that corresponds to the number of layers (e.g., 206A, 206B, etc.) included in the first model stage 206. The regularization magnitude can increase to a second magnitude greater than the initial magnitude that corresponds to the number of layers included in the second model stage 208 (e.g., 208A, 208B, 208C, etc.). In such fashion, the architecture of the model 202 can include a plurality of stages that each include a number of layers corresponds to a particular magnitude of regularization, therefore increasing the efficacy of progressive regularization during training.

Figure 3:
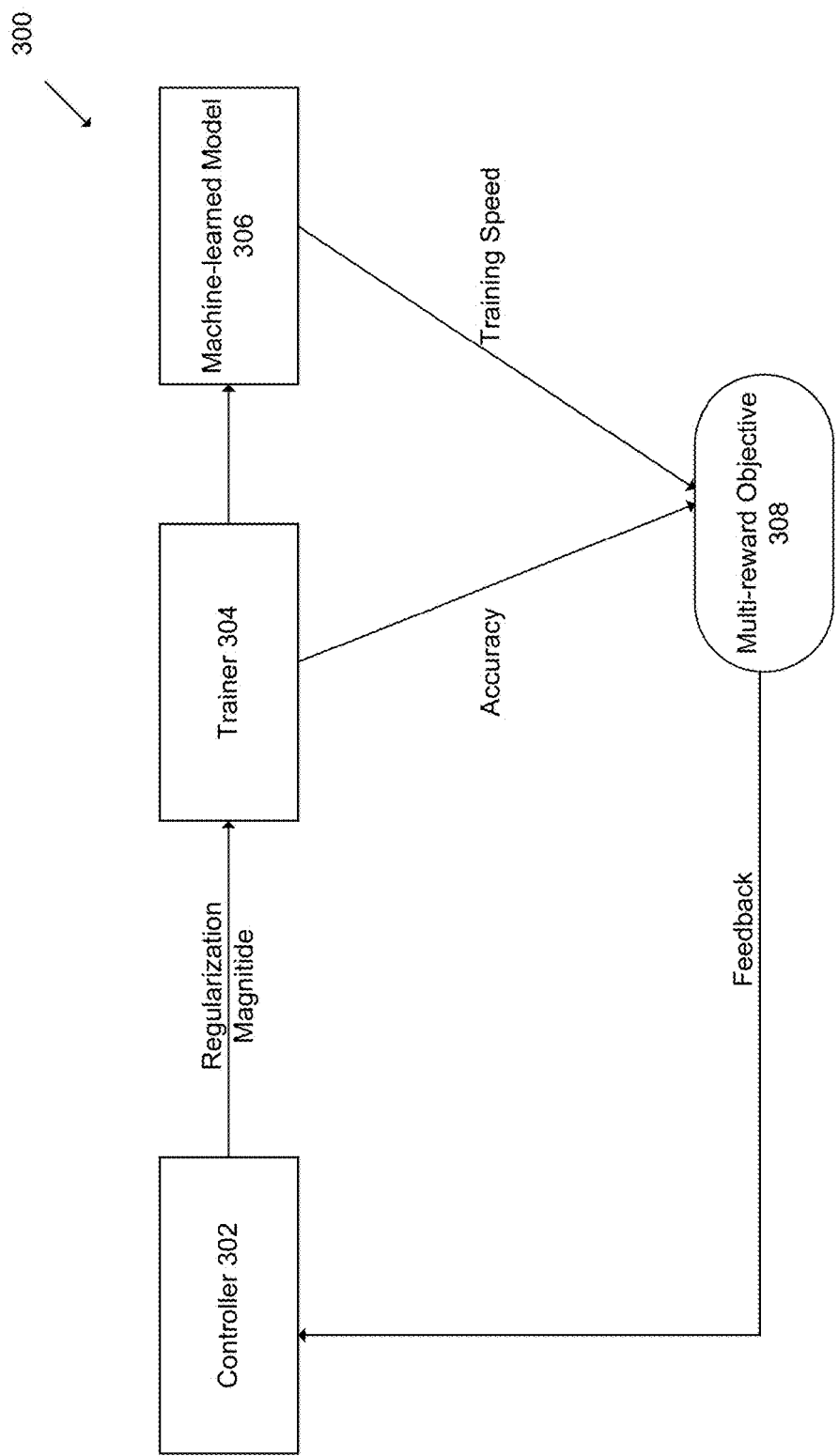
FIG. 3 depicts a graphical diagram of an example neural architecture search approach to emphasize training speed and accuracy according to example embodiments of the present disclosure.

FIG. 3 depicts a graphical diagram 300 of an example neural architecture search approach to emphasize training speed and accuracy according to example embodiments of the present disclosure. More particularly, a training controller 302 can determine a magnitude of regularization to be implemented at a trainer 304. For example, the controller 302 can progressively regularize the training process implemented by trainer 304 over a number of iterations (e.g., alteration of training data, model dropouts, etc.). The trainer 304 can train the machine-learned model 306 for a number of iterations at the regularization magnitude indicated by the controller 302.

After an initial number of training iterations, a multi-reward objective function 308 can evaluate an accuracy and training time of the machine-learned model 306 (e.g., reported by trainer 304, etc.). Based on this evaluation, the multi-reward objective function 308 can provide feedback to the controller 302, which can subsequently adjust a magnitude of regularization for additional training iterations of the machine-learned model 306.

As an example, the controller 302 can obtain a plurality of training samples, and can provide the training samples to the trainer 304. Next, the controller 302 can determine an initial magnitude of regularization for implementation at the trainer 304 that is configured to control a relative effect of one or more regularization techniques (e.g., model dropout(s), training data augmentation, etc.). For example, the controller may determine a relatively weak magnitude of regularization for training, and then progressively increase the regularization over time. In some implementations, the controller 302 can also determine an initial complexity of the training samples that corresponds to the magnitude of regularization. As an example, the controller 302 may determine a relatively weak level of training sample complexity that corresponds to the relatively weak level of regularization. For example, if the training samples include image data, the controller may downscale the images (e.g., from 800×600 to 80×60, etc.) to reduce the overall level of complexity.

The trainer 304 can train the machine-learned model 306 based at least in part on the regularization magnitude determined by the controller 302 for one or more initial training iterations. After the one or more initial training iterations, the trainer 304 can provide model accuracy data and training speed data for evaluation using a multi-reward objective function 308. In some implementations, the multi-reward objective function 308 can be configured to reward both training speed and accuracy such that training speed is increased while maintaining a specific, threshold level of accuracy.

Based on this evaluation, feedback can be provided to the controller 302. Depending on the feedback, the controller 302 can then increase the regularization magnitude progressively at the trainer 304 and the complexity of the training samples. The controller 302 can then progressively increase regularization and sample complexity implemented by the trainer 304 during model training. As such, by starting with relatively weak regularization and complexity, the trainer 304 can train the machine-learned model 306 substantially faster than would be possible using a static level of regularization and sample complexity, therefore increasing training speed and substantially decreasing associated computational resource cost.

Figure 4:
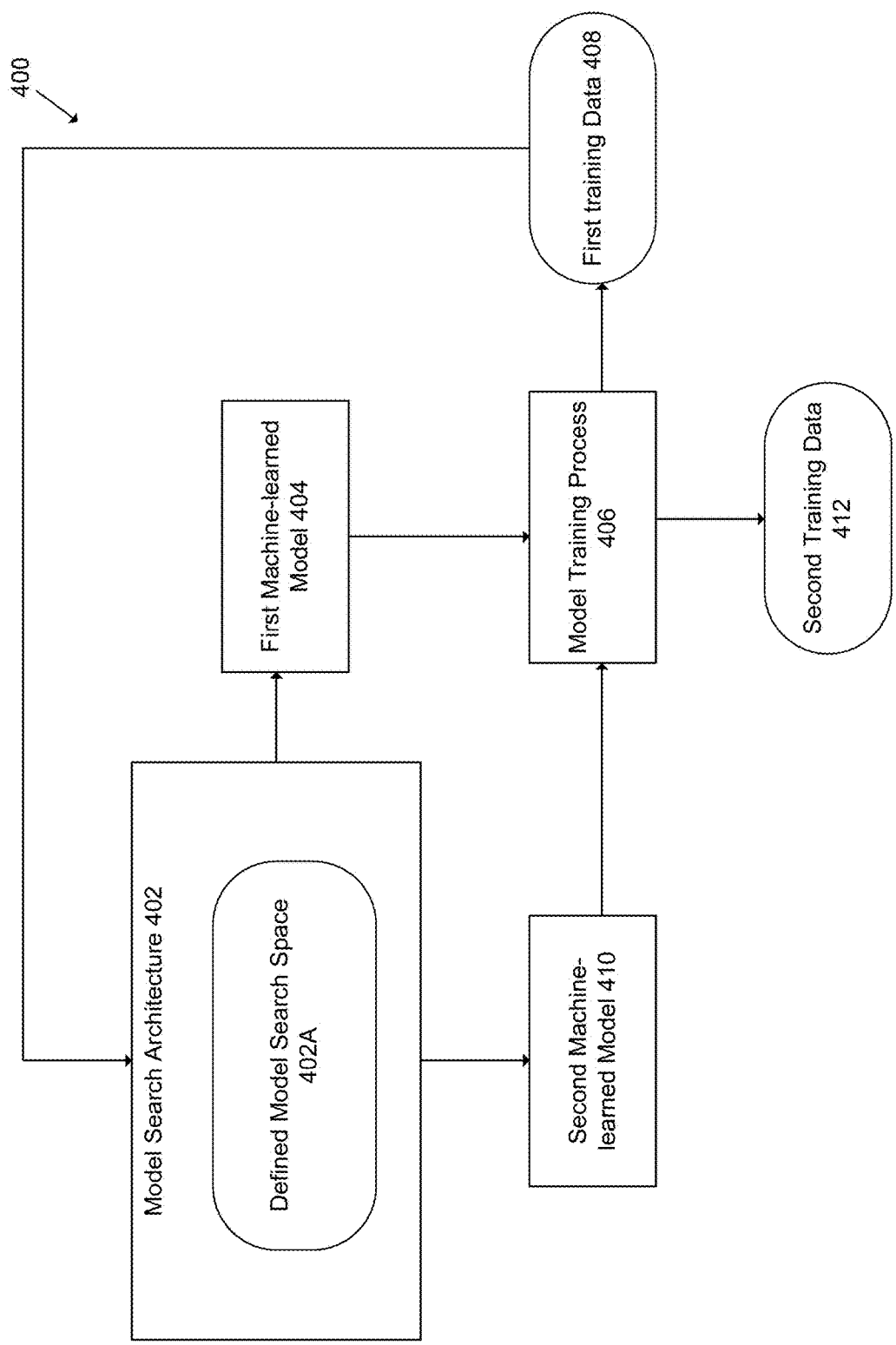
FIG. 4 depicts a data flow diagram of an example method for generation of machine-learned models with optimized training speed.

FIG. 4 depicts a data flow diagram 400 of an example method for generation of machine-learned models with optimized training speed. More particularly, a model search architecture 402 (e.g., a neural search architecture, etc.) can include or otherwise access a defined model search space 402A. The defined model search space 402A can be or otherwise include one or more searchable parameters (e.g., a number of layer(s), a type of layer(s) (e.g., convolutional layer(s), fused convolutional layer(s), fused MB-CONV layer(s), etc.), a learning rate, hyperparameter(s), layer size, channel size, kernel size, etc.). It should be broadly understood that the one or more searchable parameters of the defined model search space 402A can dictate or otherwise control any particular aspect or implementation of a machine-learned model (e.g., 404, 410, etc.).

Based on the defined model search space 402A, the model search architecture 402 can generate a first machine-learned model 404. The first machine-learned model 404 can include one or more values for the one or more searchable parameters. The first machine-learned model 404 can then be trained using model training process 406 to obtain first training data. The first training data can describe a first training speed for the training process 406 performed on the first machine-learned model 404 (e.g., an amount of time required for training, etc.).

The first training data 408 can be provided to the model search architecture 402. Based on the first training data 408, the model search architecture can generate a second machine-learned model 410 from the defined model search space 402A. The second machine-learned model 410 can include one or more values for the one or more respective searchable parameters that are different than the one or more values of the first machine-learned model 404. As an example, one value of the first machine-learned model 404 for a searchable parameter may dictate that a first type of layer is used in the first machine-learned model 404 (e.g., a standard convolutional layer, etc.). The second machine-learned model can include a value for the same parameter that instead dictates a different type of layer be used in the second machine-learned model 410 (e.g., a fused convolutional layer, etc.).

The second machine-learned model 410 can be trained using the same model training process 406 to obtain second training data 412. The second training data 412 can describe a second training speed that is faster than the first training speed described by the first training data 408. In such fashion, the model search architecture can iteratively generate machine-learned models with increasingly fast training speeds by sampling the defined model search space 402A, therefore generating a machine-learned model with optimal training speed characteristics (e.g., second machine-learned model 410, etc.).

Figure 5:
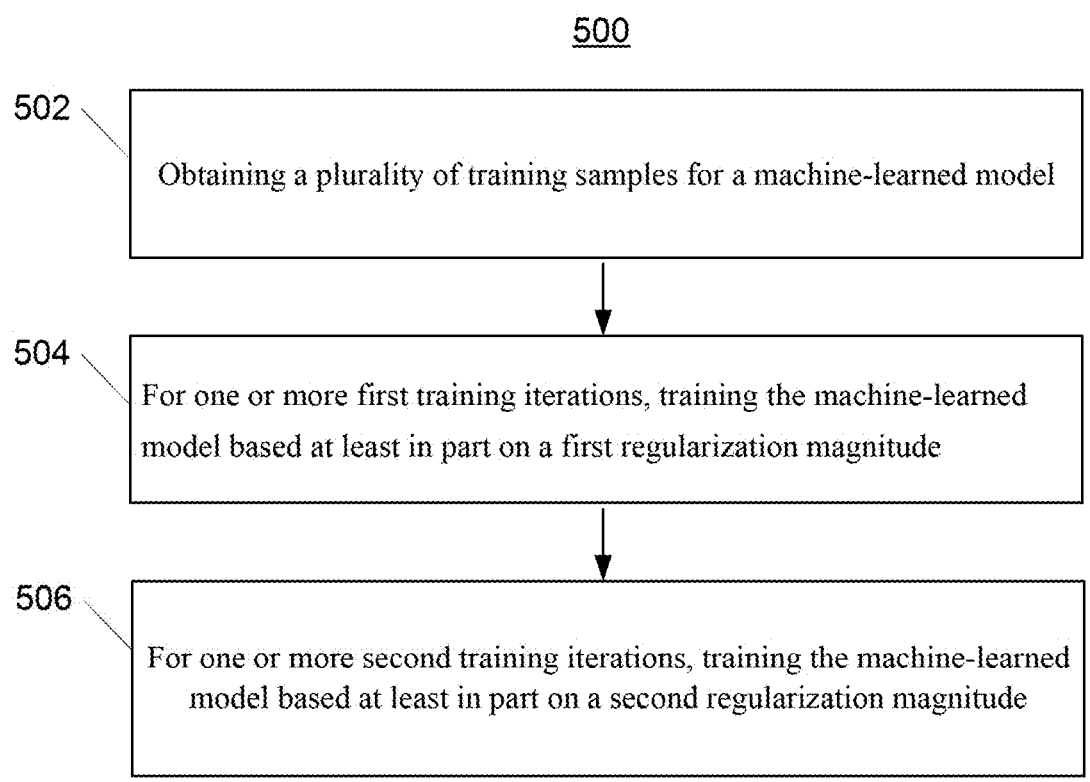
FIG. 5 depicts a flow chart diagram of an example method to perform model training using progressive regularization according to example embodiments of the present disclosure Reference numerals that are repeated across plural figures are intended to identify the same features in various implementations.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a plurality of training samples for a machine-learned model. More particularly, the computing system can obtain a plurality of training samples (e.g., image data, dataset data, etc.) of a certain complexity that can be utilized to train a machine-learned model for one or more tasks.

At 504, the computing system can, for one or more first training iterations, train the machine-learned model based at least in part on a first regularization magnitude. More particularly, for one or more first training iterations, the computing system can train, based at least in part on a first regularization magnitude configured to control a relative effect of one or more regularization techniques, the machine-learned model using one or more respective first training samples of the plurality of training samples.

At 506, the computing system can, for one or more second training iterations, train the machine-learned model based at least in part on a second regularization magnitude. More particularly, the computing system can, for one or more second training iterations, train, based at least in part on a second regularization magnitude greater than the first regularization magnitude, the machine-learned model using one or more respective second training samples of the plurality of training samples.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more processors; and
one or more non-transitory computer-readable media that store:
a machine-learned model comprising:
a first sequence of a plurality of first stages, each of the first stages comprising a regular convolution; and
a second sequence of a plurality of second stages, the second sequence subsequent to the first sequence, each of the second stages comprising a depthwise convolution; and
instructions that are executable by the one or more processors to cause the computing system to perform operations for an image processing task, the operations comprising:
inputting, to the machine-learned model, image data based on pixel data from an input image;
generating, based on the image data, and using the first sequence and the second sequence, an output from the machine-learned model; and
outputting an image processing output based on the output from the machine-learned model.

2. The computing system of claim 1, wherein the image processing output comprises a set of scores for image classification, each respective score corresponding to a respective object class and indicating a respective likelihood that the input image depicts an object belonging to the respective object class.

3. The computing system of claim 1, wherein the image processing output identifies one or more regions in the input image associated with an object of interest.

4. The computing system of claim 1, wherein the image processing output associates a first plurality of pixels with a foreground category and a second plurality of pixels with a background category.

5. The computing system of claim 1, wherein the first sequence of the plurality of first stages comprises at least three regular convolution stages.

6. The computing system of claim 5, wherein the second sequence of the plurality of second stages comprises at least three depthwise convolution stages.

7. The computing system of claim 6, wherein the second sequence comprises more layers than the first sequence.

8. A computing system, comprising:
one or more processors; and
one or more non-transitory computer-readable media that store:
a machine-learned model trained using a progressive training procedure, the progressive training procedure comprising:
an initial training stage comprising training the machine-learned model using an initial set of one or more training images having an initial resolution, the initial set of one or more training images regularized according to an initial regularization configuration; and
a plurality of subsequent training stages, each respective subsequent training stage of the plurality of subsequent training stages comprising training the machine-learned model using a respective subsequent set of one or more training images having a respective subsequent resolution, the respective subsequent set of one or more training images regularized according to a respective subsequent regularization configuration;
wherein each respective subsequent resolution for each respective subsequent training stage is greater than a preceding resolution associated with a preceding training stage;
wherein each respective subsequent regularization configuration for each respective subsequent training stage corresponds to a respective amount of regularization greater than a preceding amount of regularization associated with a preceding training stage; and
instructions that are executable by the one or more processors to cause the computing system to perform operations for an image processing task, the operations comprising:
inputting, to the machine-learned model, image data based on pixel data from an input image;
generating, based on the image data, an output from the machine-learned model; and
outputting an image processing output based on the output from the machine-learned model.

9. The computing system of claim 8, wherein the respective subsequent resolutions increase linearly over the plurality of subsequent training stages.

10. The computing system of claim 8, wherein the respective amount of regularization corresponds to an augmentation magnitude.

11. The computing system of claim 8, wherein the respective amount of regularization corresponds to a degree of color distortion.

12. The computing system of claim 8, wherein the respective amount of regularization corresponds to a degree of rotation.

13. The computing system of claim 8, wherein the respective amount of regularization corresponds to a magnitude parameter of RandAugment.

14. The computing system of claim 8, wherein the respective amount of regularization corresponds to a mixup ratio or a dropout rate.

15. The computing system of claim 8, wherein the machine-learned model comprises:
a first sequence of a plurality of first stages, each of the first stages comprising a regular convolution; and
a second sequence of a plurality of second stages, the second sequence subsequent to the first sequence, each of the second stages comprising a depthwise convolution.

16. A computer-implemented method for training-aware neural architecture search for an image processing neural network, comprising:
executing a plurality of search iterations using a search reward based on a combination of an accuracy measure and a training time measure, wherein each respective search iteration of a plurality of search iterations comprises:
generating a respective machine-learned model architecture from a defined model search space, wherein the defined model search space comprises one or more searchable parameters, wherein the respective machine-learned model architecture is configured based on one or more respective values for the one or more searchable parameters;
training a respective instance of the respective machine-learned model architecture;

computing a respective value for the training time measure for the training of the instance of the respective machine-learned model architecture;

computing a respective value for the accuracy measure of the instance of the respective machine-learned model architecture; and generating a respective value of the search reward based on combining the respective value for the accuracy measure and the respective value for the training time measure; and outputting an image processing neural network architecture from at least one of the plurality of search iterations.

17. The computer-implemented method of claim 16, wherein the training time measure indicates a time for a training step.

18. The computer-implemented method of claim 16, wherein training the respective instance of the respective machine-learned model architecture comprises:

training the respective instance of the respective machine-learned model architecture for 10 epochs.

19. One or more non-transitory computer-readable media that store:

a machine-learned model comprising:
a first sequence of a plurality of first stages, each of the first stages comprising a regular convolution; and
a second sequence of a plurality of second stages, the second sequence subsequent to the first sequence, each of the second stages comprising a depthwise convolution; and instructions that are executable by one or more processors to cause a computing system to perform operations for an image processing task, the operations comprising:
inputting, to the machine-learned model, image data based on pixel data from an input image;
generating, based on the image data, and using the first sequence and the second sequence, an output from the machine-learned model; and
outputting an image processing output based on the output from the machine-learned model.

20. The one or more non-transitory computer-readable media of claim 19, wherein the first sequence of the plurality of first stages comprises at least three regular convolution stages.

21. The one or more non-transitory computer-readable media of claim 20, wherein the second sequence of the plurality of second stages comprises at least three depthwise convolution stages.

22. The one or more non-transitory computer-readable media of claim 21, wherein the second sequence comprises more layers than the first sequence.

23. A computer-implemented method, comprising:
obtaining a machine-learned model, the machine-learned model comprising:
a first sequence of a plurality of first stages, each of the first stages comprising a regular convolution; and
a second sequence of a plurality of second stages, the second sequence subsequent to the first sequence, each of the second stages comprising a depthwise convolution; and performing operations for an image processing task, the operations comprising:
inputting, to the machine-learned model, image data based on pixel data from an input image;
generating, based on the image data, and using the first sequence and the second sequence, an output from the machine-learned model; and
outputting an image processing output based on the output from the machine-learned model.

24. The computer-implemented method of claim 23, wherein the image processing output comprises a set of scores for image classification, each respective score corresponding to a respective object class and indicating a respective likelihood that the input image depicts an object belonging to the respective object class.

25. The computer-implemented method of claim 23, wherein the image processing output identifies one or more regions in the input image associated with an object of interest.

26. The computer-implemented method of claim 23, wherein the image processing output associates a first plurality of pixels with a foreground category and a second plurality of pixels with a background category.

27. One or more non-transitory computer-readable media that store:

a machine-learned model trained using a progressive training procedure, the progressive training procedure comprising:
an initial training stage comprising training the machine-learned model using an initial set of one or more training images having an initial resolution, the initial set of one or more training images regularized according to an initial regularization configuration; and
a plurality of subsequent training stages, each respective subsequent training stage of the plurality of subsequent training stages comprising training the machine-learned model using a respective subsequent set of one or more training images having a respective subsequent resolution, the respective subsequent set of one or more training images regularized according to a respective subsequent regularization configuration;
wherein each respective subsequent resolution for each respective subsequent training stage is greater than a preceding resolution associated with a preceding training stage;
wherein each respective subsequent regularization configuration for each respective subsequent training stage corresponds to a respective amount of regularization greater than a preceding amount of regularization associated with a preceding training stage; and instructions that are executable by one or more processors to cause a computing system to perform operations for an image processing task, the operations comprising:
inputting, to the machine-learned model, image data based on pixel data from an input image;
generating, based on the image data, an output from the machine-learned model; and
outputting an image processing output based on the output from the machine-learned model.

28. A computer-implemented method, the method comprising:
obtaining a machine-learned model, the machine-learned model trained using a progressive training procedure, the progressive training procedure comprising:
an initial training stage comprising training the machine-learned model using an initial set of one or more training images having an initial resolution, the initial set of one or more training images regularized according to an initial regularization configuration; and a plurality of subsequent training stages, each respective subsequent training stage of the plurality of subsequent training stages comprising training the machine-learned model using a respective subsequent set of one or more training images having a respective subsequent resolution, the respective subsequent set of one or more training images regularized according to a respective subsequent regularization configuration;

wherein each respective subsequent resolution for each respective subsequent training stage is greater than a preceding resolution associated with a preceding training stage;

wherein each respective subsequent regularization configuration for each respective subsequent training stage corresponds to a respective amount of regularization greater than a preceding amount of regularization associated with a preceding training stage; and performing operations for an image processing task, the operations comprising:
  inputting, to the machine-learned model, image data based on pixel data from an input image;
  generating, based on the image data, an output from the machine-learned model; and
  outputting an image processing output based on the output from the machine-learned model.

29. A computer system for training-aware neural architecture search for an image processing neural network, the computer system comprising one or more processors and one or more non-transitory computer-readable media that store instructions that, when executed by the one or more processors, cause the computer system to perform operations, the operations comprising:
  executing a plurality of search iterations using a search reward based on a combination of an accuracy measure and a training time measure, wherein each respective search iteration of a plurality of search iterations comprises:
    generating a respective machine-learned model architecture from a defined model search space, wherein the defined model search space comprises one or more searchable parameters, wherein the respective machine-learned model architecture is configured based on one or more respective values for the one or more searchable parameters;
    training a respective instance of the respective machine-learned model architecture;
    computing a respective value for the training time measure for the training of the instance of the respective machine-learned model architecture;
    computing a respective value for the accuracy measure of the instance of the respective machine-learned model architecture; and
    generating a respective value of the search reward based on combining the respective value for the accuracy measure and the respective value for the training time measure; and
  outputting an image processing neural network architecture from at least one of the plurality of search iterations.

* * * * *